June 23, 1953 L. LINZELL 2,643,187
PHOTOREPRODUCTION CAMERA
Filed Nov. 22, 1950 10 Sheets-Sheet 1

Inventor
Leslie Linzell
By Hopes Leonard & Glenn
Attorneys

June 23, 1953  L. LINZELL  2,643,187
PHOTOREPRODUCTION CAMERA
Filed Nov. 22, 1950  10 Sheets-Sheet 3

Inventor
Leslie Linzell
By Vorpes Leonard & Dana
Attorneys

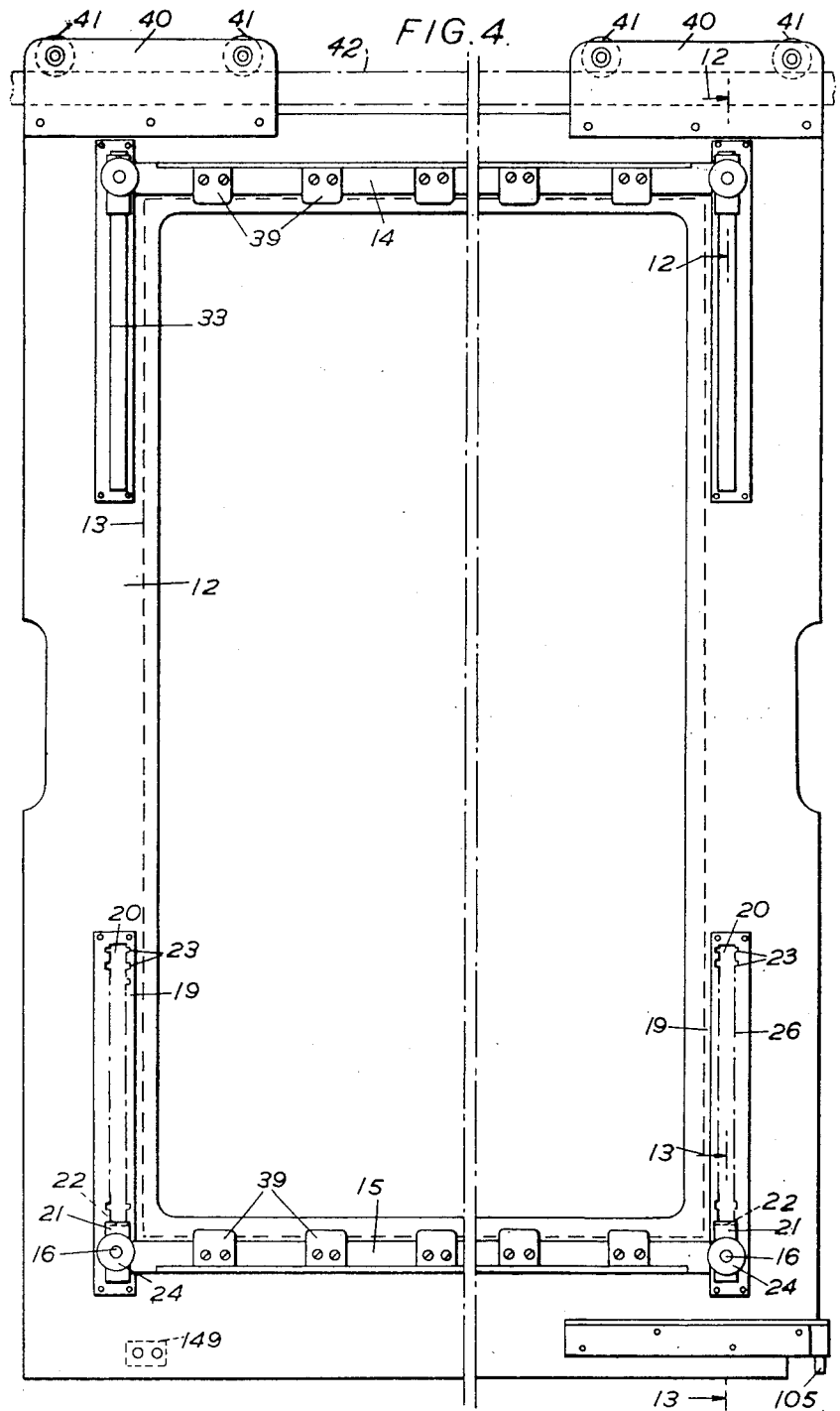

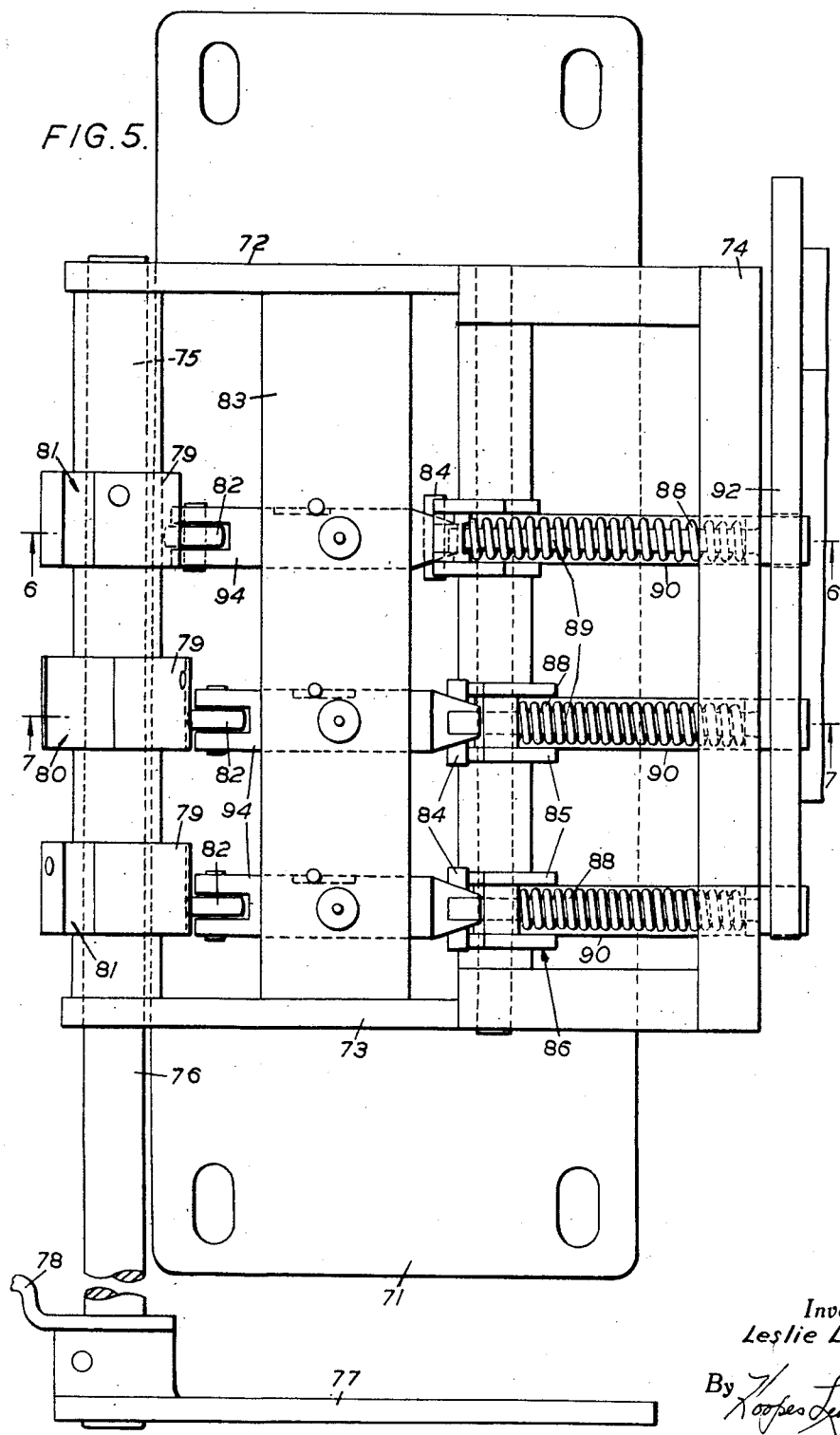

June 23, 1953    L. LINZELL    2,643,187
PHOTOREPRODUCTION CAMERA
Filed Nov. 22, 1950    10 Sheets-Sheet 6
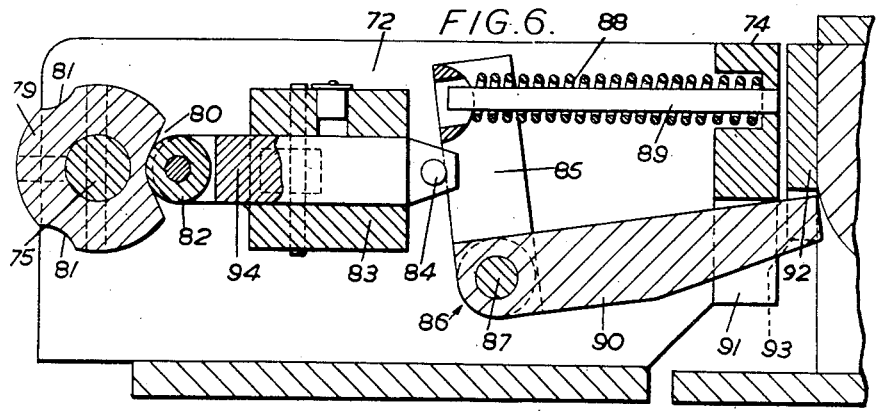
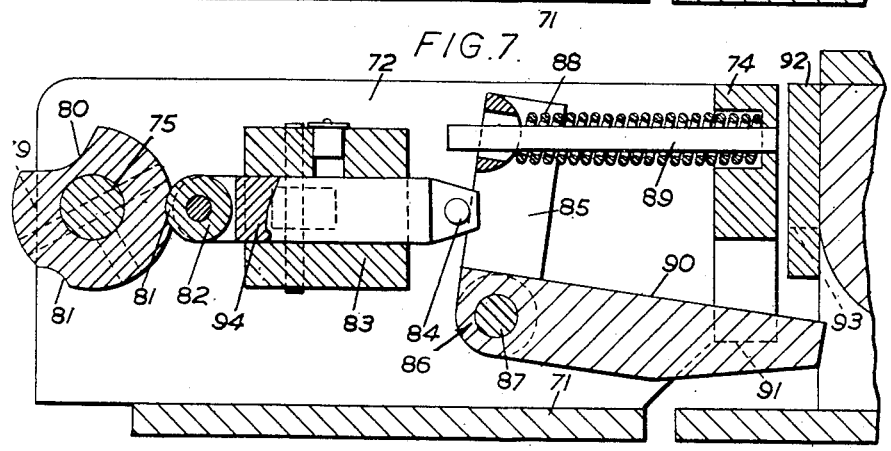
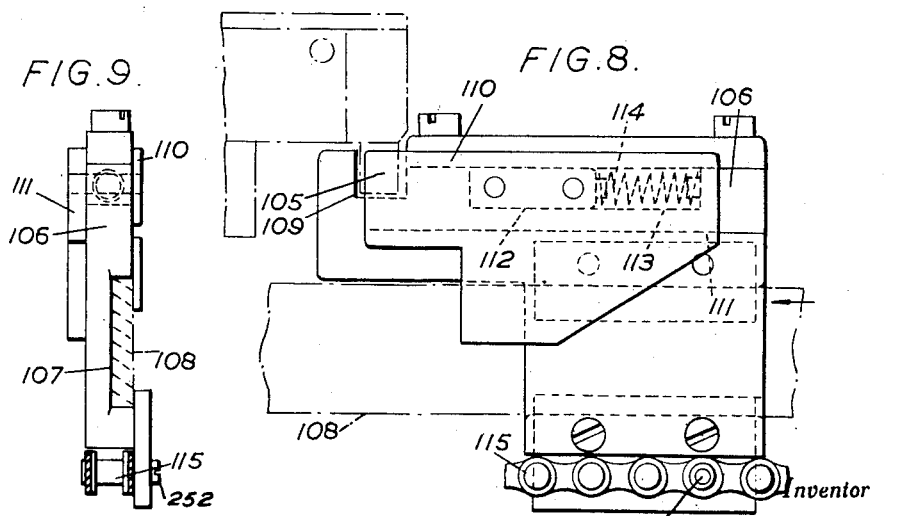
Inventor
Leslie Linzell
By Hooges Leonardt Keen
Attorneys

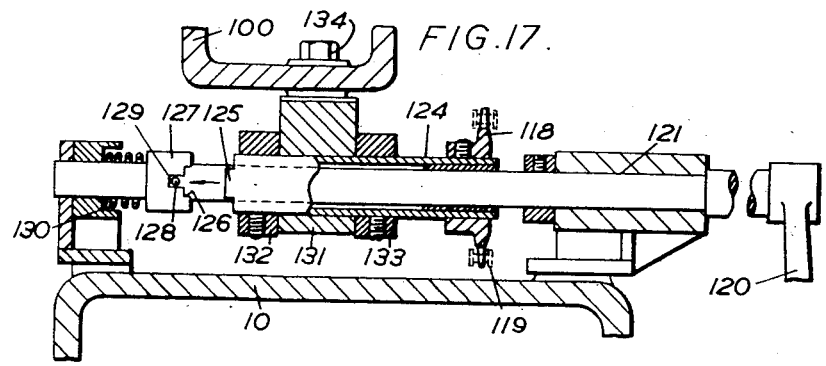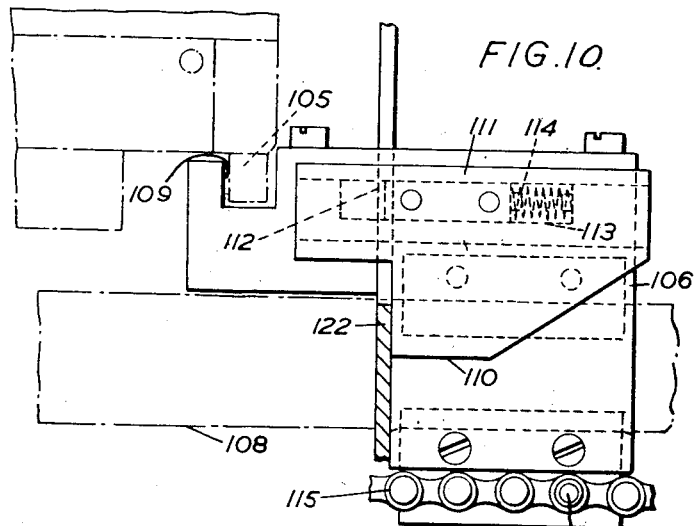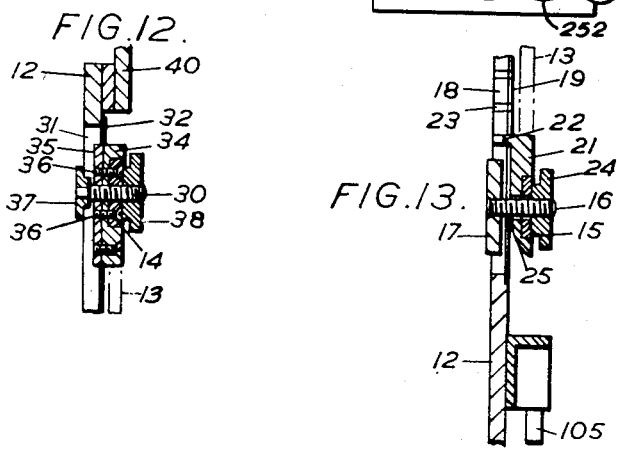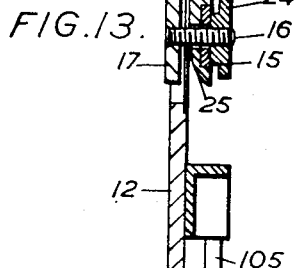

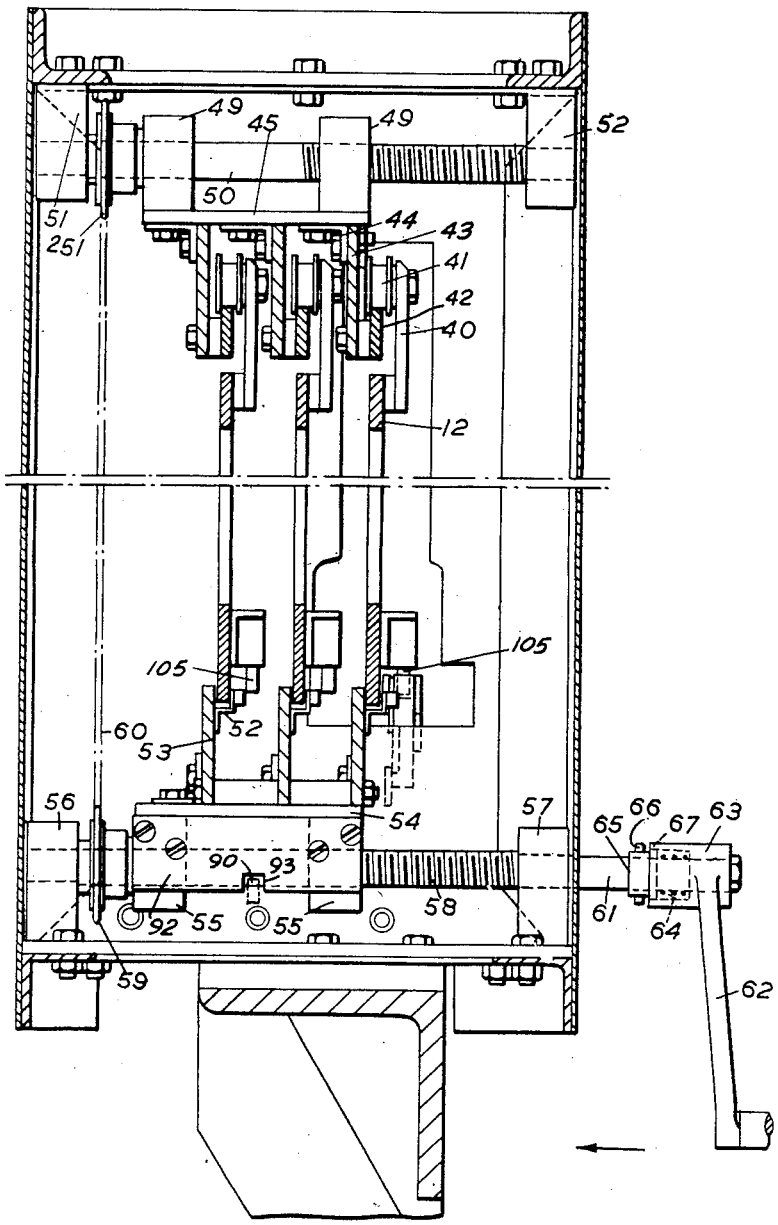

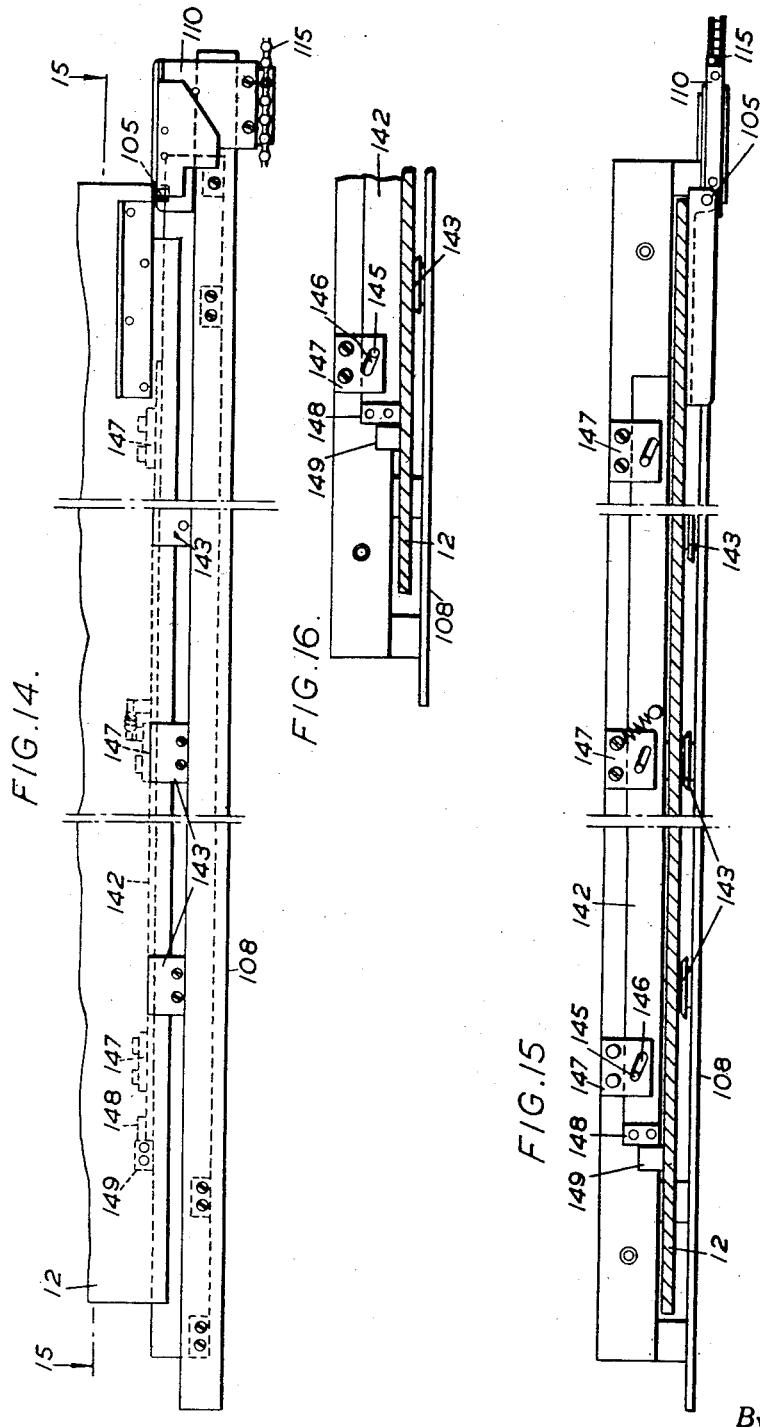

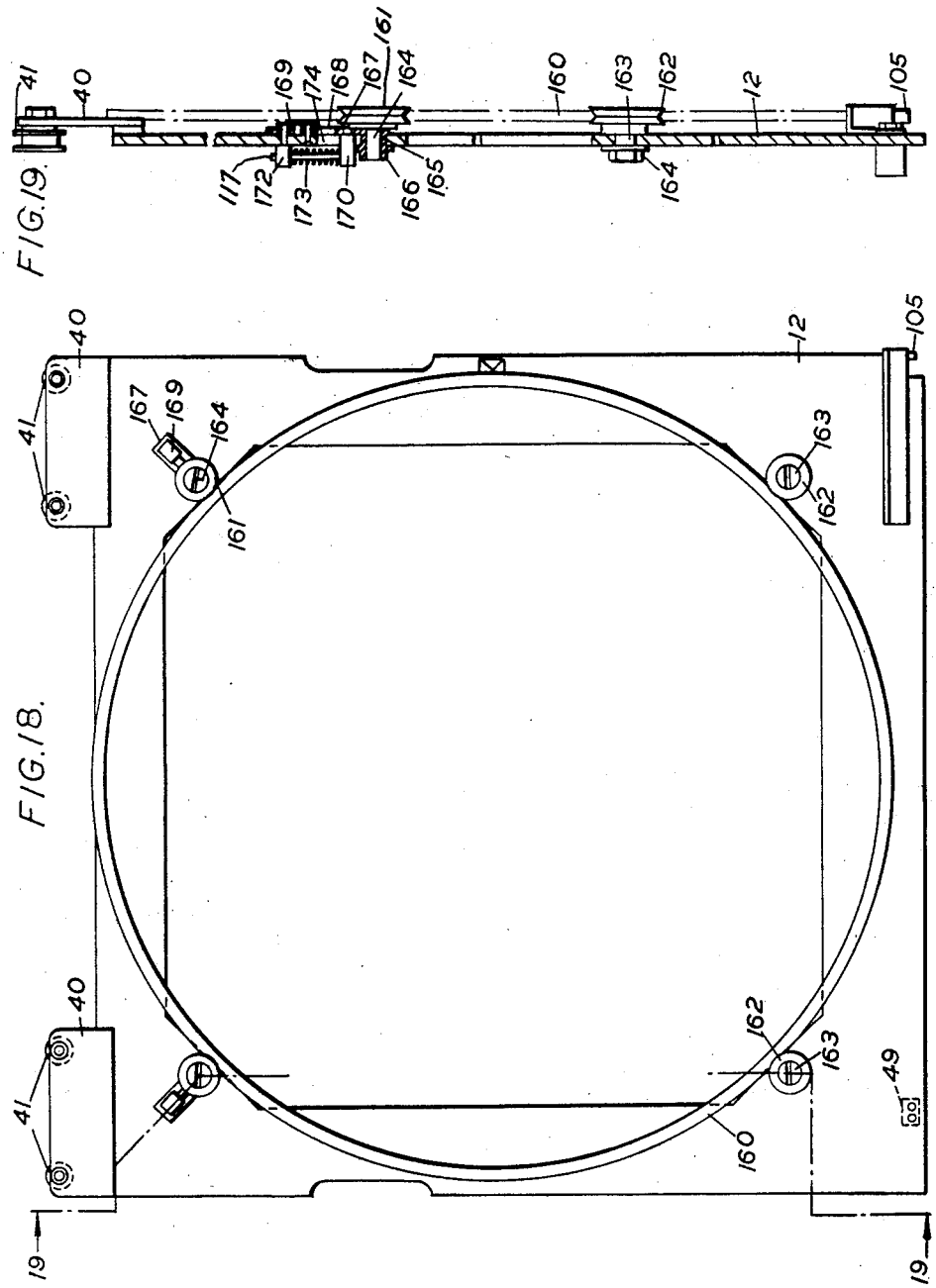

Patented June 23, 1953

2,643,187

UNITED STATES PATENT OFFICE 2,643,187

PHOTOREPRODUCTION CAMERA

Leslie Linzell, Watford, England, assignor to Pictorial Machinery Limited, London, England, a British company Application November 22, 1950, Serial No. 196,970
In Great Britain November 15, 1949

4 Claims. (Cl. 95—81)

1

This invention concerns improvements in or relating to photographic cameras of the type used for photo-reproduction and utilising a cross-line or other photo-mechanical screen for splitting up the image into a dot pattern.

The object of the invention is to provide means whereby screens of different rulings can be removed and replaced with facility and without handling. The invention is especially applicable to large size photo-reproduction cameras.

According to one feature of the present invention there is provided, a photo-reproduction camera of the type described.

In the preferred construction, the assembly of screen carriers is mounted for shifting movement as a unit in a direction normal to the plane of the screens to bring the carrier tracks selectively in alignment with the carrier tracks at the back of the camera.

There may be incorporated a pre-selector latch device for stopping and locking the screen carrier unit at a position where the carrier track of the selected screen is in alignment with the carrier track at the back of the camera.

A transfer magazine may be used for moving the selected screen along the tracks between the magazine and the operative position at the back of the camera, the transverse mechanism including a transverse endless chain, means such as a handle for driving the endless chain, and a pick-up device carried by and movable with the chain adapted to be detachably connected to the selected screen in the magazine, whereby driving of the chain causes the selected screen to be drawn by the chain along the aligned tracks between the operative and inoperative positions.

The screen carriers preferably each incorporates a horizontal transverse track rail from which the screen is suspended and on which the associated screen runs for transverse travelling movement.

The invention is illustrated by way of example in the accompanying drawings, in which:

Figure 4 is a view in elevation on an enlarged scale of a screen holder;

Figure 5 is a plan view on an enlarged scale

Figure 1:
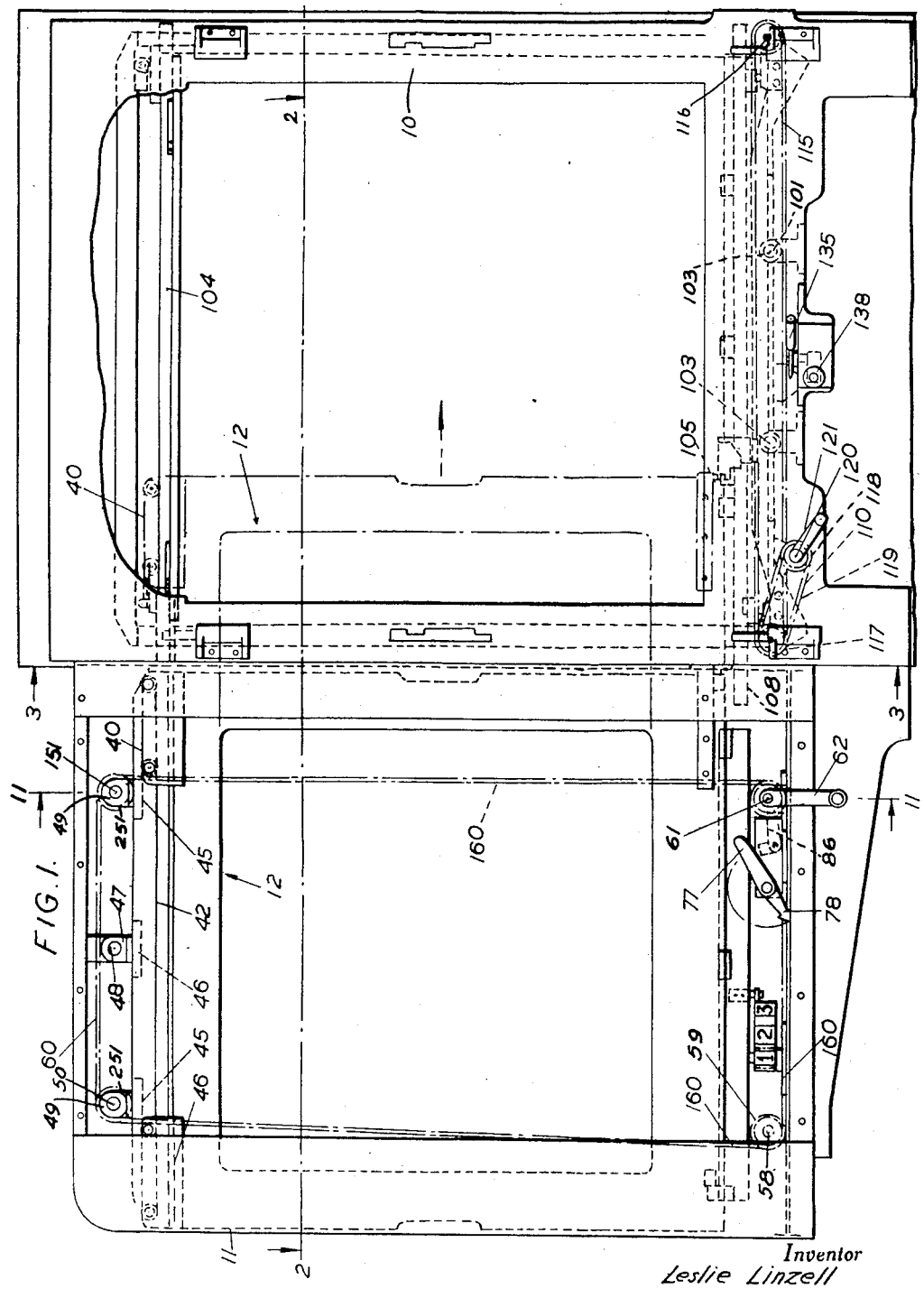
Figure 1 is a view in elevation of the back of the camera and of the screen magazine.
Figure 2:
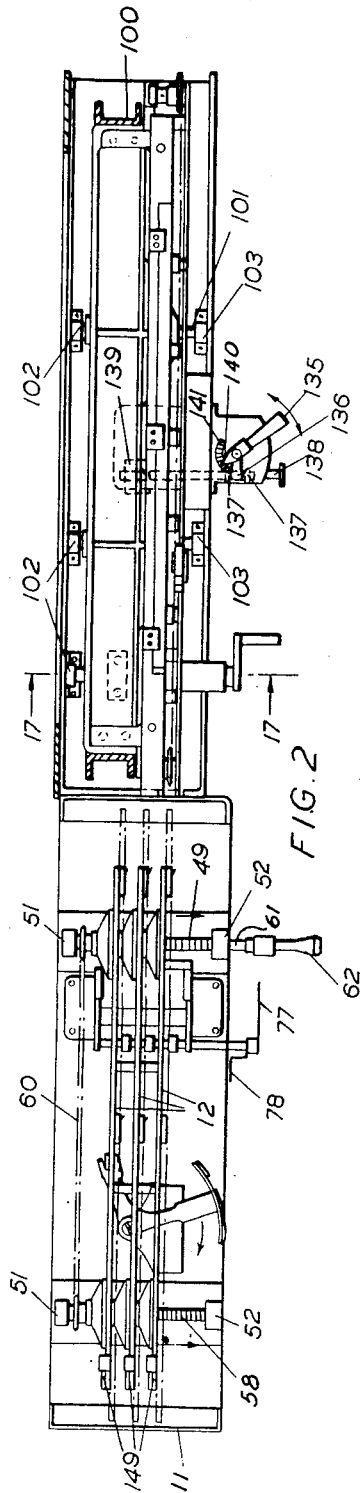
Figure 2 is a sectional view on the line 2—2 of Figure 1.

2 of a preselector device for controlling shifting movement of the screens in the magazine;

Figures 6 and 7 are respectively sectional views on the lines 6—6 and 7—7 of Figure 5;

Figures 8 and 9 are respectively side and end views in elevation, also on an enlarged scale, of a pick-up device in a transfer mechanism for rolling the screens individually between the magazine and the camera;

Figure 10 is a view similar to Figure 8 showing the pick-up device in a position at the side of the magazine for receiving a peg at a bottom corner of a screen holder;

Figure 11 is a sectional view on an enlarged scale through the magazine on the line 11—11 of Figure 1;

Figures 12 and 13 are sectional views through the upper and lower portions of a screen holder on respectively the lines 12—12 and 13—13 of Figure 4;

Figure 14 is a fragmentary view in elevation of the bottom of a screen holder in position at the back of the camera;

Figure 15 is a sectional plan view on the line 15—15 of Figure 14;

Figure 16 is a view similar to the left hand portion of Figure 15 showing the parts in a position for clamping the screen holder;

Figure 17 is a sectional view in elevation on an enlarged scale on the line 17—17 of Figure 2;

Figure 18 is a front elevation of another form of screen holder adapted detachably to receive a round screen; and Figure 19 is a section on an enlarged scale on the line 19—19 of Figure 18.

Figure 3:
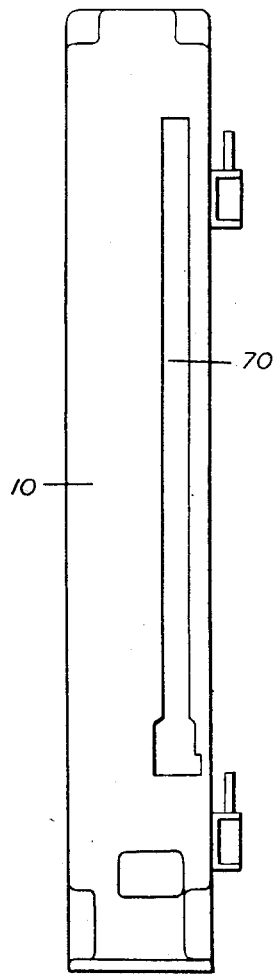
Figure 3 is a view in side elevation on the line 3—3 of Figure 1 at the junction of the framings for the camera back and the screen magazine.

Referring first to Figures 1 to 3, at the back of the camera is a framing 10, where the sensitized plate and the screen are positioned one in front of the other during reproduction work. At one side of the camera back is fitted a magazine 11 for storing three holders 12 each detachably fitted with a screen 13 (see Figures 4, 12 and 13). The holders and screens are positioned vertically one behind the other in planes parallel with each other and with the sensitized plate.

Screen holders

A screen holder is shown in detail in Figures 4, 12 and 13. It is provided with a rigid rectangular frame. The screen 13 is supported at the back of the frame between an upper crossbar 14 and a lower cross bar 15. These two cross-bars are both capable of up-and-down adjustment so as to render the holder capable of taking screens of different size.

The lower cross-bar 15 is carried at each end on a stud 16 (Figure 13) fitted to a slide 17 that runs in a vertical slot 18 within a side member of the holder frame. Th stud projects through a metal guard 19 fixed over the front of the slot 18. The guard itself is formed with a vertical slot 20 which is aligned with the frame slot 18. The stud 16 also loosely carries a stop element 21 having a rib 22 at its upper end which is adapted selectively to be engaged in slots 23 formed in the two vertical side edges of the slots 18, 20. On the free end of the stud is screwed a nut 24.

When the nut 24 is partially unscrewed, the stop 21 is free to be tilted by reason of its loose fitting. A chamfered lower portion 25 is provided on the lower end of the stop, to enable the rib 22 to be disengaged from the slots 23. With the ribs of the two stops thus disengaged, the ends of the cross-bar can be vertically adjusted. The cross-bar is locked in its adjusted position by engaging the ribs on the stops within selected sets of slots, whereupon the nuts 24 are screwed tight on the studs 16. The cross-bar is then positively locked to the holder frame so as safely to support the weight of the screen.

The upper cross-bar 14 is fitted at each end (Figure 12) on a stud 30 that is slidable in a vertical slot 31 within a side member of the screen frame. Fixed over the slot is a metal guard 32 having a vertical slot 33 aligned with the slot 31. The marginal edges at the sides of the slot 33 are slidably engaged by channels at the sides of two blocks 34, 35 secured together by screws 36. The stud 30 is fitted to a bridge member 37 extending across the slot 31. On the back end of the stud is a nut 38. When the two nuts are screwed tight on their studs, the bridge members 37 securely clamp the ends of the cross-bar 14 to the screen holder.

Lugs 39 (Figure 4) on the upper and lower cross bars 14, 15 hold the screen against the holder frame.

It will be seen that the screen is also adjustable laterally of the holder by sliding it to one side or other between the cross-bars 14, 15.

*Screen carrier*

For supporting a screen holder 12 in position either within the magazine or at the back of the camera, and also for transferring the screen holder from one position to the other, each screen holder is provided at its upper corners with brackets 40, each fitted with two flanged rollers 41. When the screen holder with its screen is positioned within the magazine, the rollers rest upon a horizontal cross rail 42 fitted to a plate 43 (Figure 11) carried by a bracket 44 at its upper end. The rail, plate and bracket together form a carrier unit for supporting the suspended holder and its screen.

There is one screen carrier for each screen holder, and as shown in Figures 2 and 11, the three screen carriers are suspended one behind the other from the upper portion of the magazine. The three screen carrier units are connected together at their corners by end cross plates 45 (Figures 1 and 4) and also by a central cross plate 46 (Figure 1). On the centre plate 46 is mounted a bearing block 47 which is slidably guided on a horizontal support rod 48 that extends from front to back of the magazine.

On each of the two end plates 45 is mounted a pair of bearers 49 (Figure 4) fitted on shafts 50 which are parallel with the rod 48 and are rotatable in front and back bearings 51, 52 (omitted in Figure 1). The back portion of each shaft is in screw-threaded engagement with the back bearer 49. At their front ends the screw shafts are fitted with chain sprockets 251.

The lower horizontal edges of the suspended screen holders are engaged in channel guides 52 (Figure 4) at the upper ends of register bars 53. The lower ends of the register bars are supported on cross plates 54, each fitted with a pair of bearers 55 mounted for sliding movement on a shaft 58 carried by front and back bearings 56, 57. The back end of each shaft is in screw-threaded engagement with the back bearer 55. On the front end of each shaft is a chain sprocket 59.

The sprockets 251, 59 on the four parallel screw-shafts 50, 38 at the four corners of the screen holders are coupled together by an endless driving chain 60.

*Screen shifter mechanism*

One of the two lower screw shafts 58 has a rear extension 61 (Figure 11) fitted with a handle 62. The handle has a hollow boss 63 within which is fitted a coil compression spring 64 bearing at its ends against a collar 65 and the inner end of the recess in the boss. Through the collar extends a pin 66 adapted to engage in slots 67 of the boss when the handle is pushed inwardly, as shown by the arrow in Figure 11. Normally the pin and slots are held disengaged by the spring. The arrangement therefore affords a clutch.

By pushing in and then turning the handle 62, the complete assembly of screen carriers and screen supports is shifted bodily backwards or forwards in a direction normal to the plane of each screen. The object of so shifting the assembly is to bring a selected screen edge opposite a vertical slot 70 (Figure 3) in the camera body for transfer of that screen from the magazine into a face-to-face position with the sensitized plate in the camera.

A pre-selector latch device is provided in the base of the magazine for automatically stopping and locking the screen carrier assembly when it reaches the correct position for transfer of the selected screen. The pre-selector device is illustrated in detail in Figures 5, 6 and 7.

This device is provided with a base 71 having two end plates 72, 73 and a side plate 74. At the open side of the base is fitted a cam-shaft 75 journalled in the end plates and having an extension 76 fitted with a handle 77 and a pointer 78 (see also Figures 1 and 2). The pointer moves over an arcuate scale (not shown) at the front of the magazine. The scale is marked 1–2–3 corresponding to the numbers of the three screens in the magazine. The cam-shaft carries three peripheral cams 79 each formed with a cam recess 80 and with two click recesses 81 set at 120° to each other and to the cam recess. The three cams are angularly offset by 120°. They are also spaced apart along the cam-shaft by distances corresponding to the spacing between the three screens in the magazine. The face of each cam is engaged by a roller 82 at the outer end of a horizontal plunger 94 slidable within a cross-bar 83 connecting the two end plates 72, 73. The inner end of the plunger is tapered and carries a transverse pin 84. The projecting ends of this pin are engaged by the upper forked arm 85 of a bell-crank lever 86. The three bell-crank levers 86 are supported upon a common pivot pin 87. The upper end of each forked arm 85 is acted upon by one end of a coil compression spring 88 fitted on a guide rod 89 secured at one end to the side plate 74 on the base.

The lower arm 90 of each bell-crank extends approximately horizontally through a guide slot 91 in the side 74 and under the lower edge of the vertical locking plate 92 carried by a pair of bearers 55 on one of the lower screw shafts 58 in the magazine. In the bottom edge of this locking plate is a single slot 93 for receiving the end of one of the arms 90 of the bell crank levers. When the arm is engaged within the slot 93, the screen carrier assembly is locked against shifting movement.

When the lever 77 is turned to bring the pointer 78 opposite the number for the selected screen, the consequent rotation of the cam-shaft 75 turns the appropriate cam 79 to an angular position at which the cam recess 80 is opposite the roller 82 of the adjacent plunger 94. This plunger is then free to move outwardly (i. e. towards the left in Figures 5, 6, and 7) under the action of the spring 88 bearing on the forked arm 85 of the bell crank lever. As the bell crank lever rocks in an anti-clockwise direction, the lower arm 90 of the bell crank rises into resilient contact with the lower edge of the locking plate 92. During the shifting movement of the screen carriers, the lower arm 90 rides along this edge until it comes into register with the slot 93; and the end of the arm then enters the slot under the action of the compression spring, thereby acting as a latch to lock the screen carrier assembly against further movement. This locking position is indicated in Figure 6. The purpose of the click recesses 81 is to enable the operator to feel the three positions for the cam-shaft when he turns the hand lever 77.

Screen transfer mechanism

In the back of the camera is a rigid vertical frame 100 of rectangular form (Figure 2). This frame is supported along its lower side for limited backwards-and-forwards movement upon a pair of horizontal guide rods 101 mounted in end brackets 102, 103. The means for adjusting the movable frame will be described later. Across the upper portion of the frame is a horizontal rail 104 (Figure 1). When the selected screen in the magazine is in a position for transfer to the camera, the supporting rail 42 for that screen is in alignment with the rail 104 on the frame 100. For transferring the screen from the magazine to the camera, the holder for that screen is run along the rail 42 on to the rail 104 through the slot 70 (Figure 3).

For effecting the transfer movement, a peg 105 is fitted to each screen holder at one of its lower edges (Figure 4). The peg 105 is adapted to be engaged in the pick-up device shown in Figures 8, 9 and 10. This device consists of a bolck 106 having a channelled portion 107 which is slidable on a horizontal guide rail 108 fitted along the lower portion of the frame 100. At the front end of the block is a slot 109 for receiving the peg 105 on the screen holder. The slot is normally shrouded at each side by a pair of plates 110, 111. These plates are fitted at each side of a slide 112 which moves within a slot 113 in the upper portion of the block 106. A coil compression spring 114 in the slot 113 acts resiliently on one end of the slide to hold the shroud plates 110, 111 over the slot 109. When the shroud plates are in this position, the peg 105 on the screen holder is retained within a slot against accidental removal.

The pick-up device is moved backwards and forwards along the horizontal rail 108 by an endless chain 115 which is fixed by a screw 252 to the device and which runs over end sprockets 116, 117 (Figure 1). This endless chain is driven from a third sprocket 118 by a short endless chain 119. The third sprocket is driven by a handle 120 through a shaft 121.

When it is desired to transfer a screen from the magazine to the camera, the handle 120 is turned in order to shift the pick-up device along the rail towards the left in Figures 1 and 2. Near its terminal position, the slotted end of the pick-up device passes through the slot 70 at the junction between the magazine and camera. During this movement the shroud plate 110 comes against a stop 122, Figure 10, which acts to hold back the two shroud plates during the final movement of the block 106. In this way, the slot 109 at the end of the block is opened to receive the peg 105 on the screen carrier.

When the appropriate screen holder has been shifted to bring the selected screen in position within the magazine, whereby the peg 105 is engaged in the slot 109, the handle 120 is then turned in the opposite direction in order to shift the selected screen in its holder sideways through the slot and then into position in the camera adjacent the sensitised plate.

Screen-adjusting device

As has already been explained, the rectangular frame 100 in the camera is capable of limited backwards-and-forwards movement. To ensure that the rail 104 on this frame is in alignment with the rail 42 on the screen carrier during the transfer operation, the handle 120 is normally declutched from the driving sprocket 118, and the clutch is only engaged when the two rails have been brought into alignment. For this purpose, as shown in Figure 17, the third sprocket 118 is fixed on a sleeve 124 which is slidable along the driving shaft 121. On that end of the sleeve remote from the sprocket are dogs 125 for engaging recessess 126 in a collar 127 carried by the driving shaft. A pin 128 fitting in another recess 129 keys the collar to the shaft. The collar is capable of limited axial movement on the shaft, and is backed by a coil compression spring 130. The spring thereby acts as a shock absorber when the sleeve is shifted to engage the dog teeth with the collar. The sleeve carries a bracket 131 which is located between collars 132, 133 and is secured to the frame 100 by a stud 134.

The dog clutch is engaged to permit rotation of the third sprocket 118 by the handle 120 only when the frame 100 is in its foremost position, i. e., to the left of Figure 17. To move the frame, there is provided (see Figures 1 and 2) a hand lever 135 having a short arm 136 engaged between collars 137 on a horizontal push-and-pull rod 138 connected at 139 adjacent its forward end to the frame 100. The lever carries a pointer 140 which rides over a scale 141 marked to indicate the spacing of the screen from the sensitised plate in the camera.

Behind the rail 108 that carries the pick-up device is a horizontal locking bar 142 (Figures 14, 15 and 16) for engaging the back of the screen holder 12 along its lower edge so as to hold it firmly against lugs 143. This locking bar is fitted with upright pins 145 that are guided within oblique slots 146 in fixed plates 147. At one end of the locking plate is a block 148. As the screen holder moves into position at the back of the camera, a thrust element 149 at the rear end of the holder engages the block 148 and shifts the locking bar across the camera, i. e. in the direction of its length. By reason of the inter-connection between the pins 145 and the oblique slots 146, the locking bar 142 is also shifted backwardly so as to clamp the screen holder against the lugs. This clamping position is shown in Figure 16.

The screen holder shown in Figures 18 and 19 is intended for supporting round screens. It is similar to the previous holder except for the means of detachably securing the screen at the back face of the holder. The rim of the screen 160 is engaged by pairs of upper and grooved rollers 161 and 162 respectively. The lower rollers 162 are fixed to the holder on pivot studs 163 fitted with nuts 164. The upper rollers 161 are mounted for limited radial movement so as to permit insertion and removal of the screen. Each roller 161 is carried on a pivot stud 164 fitted with a collar 165 and secured by a nut 166 to a sliding plate 167. The collar 165 slides in a radial slot 174 within the holder frame. The plate 167 also has a radially-directed slot 168 which is engaged by a guide 169 fixed to the holder. On the plate 167 is a lug 170 carrying a rod 171 slidable in a fixed guide 172. The rod is fitted with a coil compression spring 173. The spring acts through the lug 170 resiliently to hold the roller 161 in a radially inward securing position.

I claim:

1. A photo-reproduction camera of the type described, in combination with a magazine at one side of the camera for storing a plurality of screens arranged one behind the other in vertical planes transverse to the camera axis, a carrier for supporting each screen in the magazine and incorporating a horizontal track parallel with the plane of the screen, on which track the screen is guided for transverse travelling movement between an inoperative position in the magazine and an operative position at the back of the camera, a screen carrier at the back of the camera for there supporting a screen in a vertical operative position, said camera-back screen-carrier incorporating a horizontal track on which the screen is guided for lateral travelling movement towards and away from the magazine, the assembly of magazine screen-carriers being mounted for shifting movement as a unit in a direction normal to the planes of the screens, means for shifting the magazine screen-carriers as a unit relatively to the camera-back carrier in a horizontal direction normal to the planes of the screens to bring the tracks of the magazine screen-carriers selectively into alignment with the track at the camera back to permit transverse travelling movement of the selected screen along the aligned tracks for transfer to and from the operative and inoperative positions, a plurality of latch means associated respectively with the magazine screen-carriers and operable to lock the magazine screen-carriers unit against shifting movement as aforesaid when the track of the magazine screen-carrier associated with an operative latch means becomes aligned with the track at the camera back, and selector means for rendering operative any one of the latch means preselected at will, whereby the magazine screen-carriers are stopped and locked automatically when the track of the magazine screen-carrier associated with the preselected latch means comes into alignment as aforesaid during shifting movement of the magazine screen-carriers as aforesaid.

2. A photo-reproduction camera according to claim 1, including a latch plate formed with a notch, and wherein each said latch means comprises, in combination with said latch plate, a latch arm movable with the magazine screen-carriers and spring means urging said latch arm into engagement with said latch plate to ride thereon during shifting movement of the magazine screen-carriers and to enter said notch when the track of the associated magazine screen-carrier is aligned with the track at the camera back, and wherein the said selector means comprise means for selectively holding all but a selected one of the latch arms out of engagement with the latch plate against the action of the spring means, the said selected latch arm being the latch arm of the preselected latch means.

3. A photo-reproduction camera according to claim 2, wherein the selector means comprise cam means and abutment members movable thereby to hold the latch arms selectively as aforesaid.

4. A photo-reproduction camera according to claim 3, wherein the cam means are formed with interengaging parts which parts, by their interengagement, tend to hold the cam means against movement away from the positions in which they hold unselected latch arms as aforesaid, whereby additional effort is required to move the cam means away from such positions and thus setting of the cam means to each of such positions is facilitated.

LESLIE LINZELL.

References Cited in the file of this patent

UNITED STATES PATENTS

| Number | Name | Date |
| --- | --- | --- |
| 522,921 | Spooner | July 10, 1894 |
| 544,493 | Wigle | Aug. 13, 1895 |
| 1,187,045 | Bouzek | June 13, 1916 |
| 1,209,239 | Wende | Dec. 19, 1916 |
| 1,402,791 | Petherick | Jan. 10, 1922 |
| 1,558,272 | Pedersen | Oct. 20, 1925 |
| 2,115,233 | Powers | Apr. 26, 1938 |
| 2,150,974 | Huebner | Mar. 21, 1939 |
| 2,402,107 | Wekeman | June 11, 1946 |
| 2,557,182 | Forgett | June 9, 1951 |
| 2,590,492 | Bennett et al. | Mar. 25, 1952 |